(12) United States Patent
Aratsu et al.

(10) Patent No.: US 8,595,511 B2
(45) Date of Patent: Nov. 26, 2013

(54) SECURELY MANAGING THE EXECUTION OF SCREEN RENDERING INSTRUCTIONS IN A HOST OPERATING SYSTEM AND VIRTUAL MACHINE

(75) Inventors: Taku Aratsu, Kanagawa (JP); Sanehiro Furuichi, Kanagawa (JP); Tada Masami, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/488,369

(22) Filed: Jun. 4, 2012

(65) Prior Publication Data

US 2013/0007469 A1 Jan. 3, 2013

(30) Foreign Application Priority Data

Jun. 29, 2011 (JP) ................................. 2011-143993

(51) Int. Cl.
 *H04L 9/00* (2006.01)
 *G06F 9/455* (2006.01)
(52) U.S. Cl.
 USPC ............................. 713/190; 711/163; 711/164
(58) Field of Classification Search
 USPC ............ 713/189–191; 718/1; 711/163, 164, 6
 See application file for complete search history.

(56) References Cited

U.S. PATENT DOCUMENTS

| | | | |
|---|---|---|---|
| 5,752,005 A | 5/1998 | Jones | |
| 6,356,915 B1 | 3/2002 | Chtchetkine et al. | |
| 6,978,439 B2 | 12/2005 | Kelley et al. | |
| 7,181,738 B2 * | 2/2007 | Chan | 717/175 |
| RE40,702 E * | 4/2009 | Pizano et al. | 380/201 |
| 7,624,427 B2 | 11/2009 | Furuichi et al. | |
| 7,814,335 B2 * | 10/2010 | Rao et al. | 713/191 |
| 7,844,492 B2 * | 11/2010 | Perkowski et al. | 705/14.4 |

(Continued)

FOREIGN PATENT DOCUMENTS

| | | |
|---|---|---|
| JP | 2007-058749 | 3/2007 |
| JP | 2007-287078 | 11/2007 |

(Continued)

OTHER PUBLICATIONS

B. Li et al., "A VMM-based System Call Interposition Framework for Program Monitoring", 16th International Conference on Parallel and Distributed Systems, dated 2010, pp. 1-6.

(Continued)

*Primary Examiner* — Haresh N Patel
(74) *Attorney, Agent, or Firm* — David W. Victor; Konrad, Raynes, Davda & Victor LLP

(57) ABSTRACT

Provided are a computer readable storage medium, computer apparatus, and method for securely managing the execution of screen rendering instructions in a host operating system and virtual machine. A first rendering instruction hooking section is set to a first mode to hook a screen rendering instruction issued by a virtual machine application in a virtual machine. A second rendering instruction hooking section is set to a second mode to hook instructions issued by the virtual machine application. The hooked screen rendering instruction issued by the virtual machine application are encrypted in response to the setting of the first mode to produce illegible output. The hooked screen rendering instruction issued by the virtual machine application are encrypted in response to the setting of the second mode. The encrypted hooked screen rendering instruction encrypted in the second mode are issued to a host operating system to decrypt.

24 Claims, 14 Drawing Sheets

(56) References Cited

U.S. PATENT DOCUMENTS

| | | | |
|---|---|---|---|
| 7,987,506 B1* | 7/2011 | Khalid et al. | 726/15 |
| 8,205,072 B1* | 6/2012 | Gentil et al. | 713/153 |
| 8,400,530 B2* | 3/2013 | Ikeda et al. | 348/231.99 |
| 2002/0194394 A1* | 12/2002 | Chan | 709/319 |
| 2003/0236889 A1* | 12/2003 | Manion et al. | 709/227 |
| 2004/0024710 A1* | 2/2004 | Fernando et al. | 705/50 |
| 2004/0239700 A1 | 12/2004 | Baschy | |
| 2005/0076326 A1 | 4/2005 | McMillan et al. | |
| 2005/0120242 A1* | 6/2005 | Mayer et al. | 713/201 |
| 2005/0144072 A1* | 6/2005 | Perkowski et al. | 705/14 |
| 2007/0094076 A1* | 4/2007 | Perkowski et al. | 705/14 |
| 2007/0100967 A1* | 5/2007 | Smith et al. | 709/219 |
| 2007/0234229 A1* | 10/2007 | Ohtsuka et al. | 715/781 |
| 2007/0250903 A1 | 10/2007 | Furuichi et al. | |
| 2007/0277029 A1* | 11/2007 | Rao et al. | 713/2 |
| 2007/0283389 A1* | 12/2007 | Hallberg | 725/37 |
| 2008/0015937 A1* | 1/2008 | Perkowski et al. | 705/14 |
| 2008/0021778 A1* | 1/2008 | Perkowski et al. | 705/14 |
| 2008/0097847 A1* | 4/2008 | Perkowski et al. | 705/14 |
| 2008/0120350 A1* | 5/2008 | Grabowski et al. | 707/202 |
| 2008/0282319 A1 | 11/2008 | Fontijn et al. | |
| 2009/0158190 A1* | 6/2009 | Higginson | 715/773 |
| 2009/0241114 A1 | 9/2009 | Kirihata | |
| 2009/0254990 A1 | 10/2009 | McGee | |
| 2010/0058082 A1* | 3/2010 | Locker et al. | 713/320 |
| 2010/0107163 A1 | 4/2010 | Lee | |
| 2010/0266121 A1 | 10/2010 | Yamazaki et al. | |
| 2010/0283586 A1* | 11/2010 | Ikeda et al. | 340/10.42 |
| 2011/0007901 A1* | 1/2011 | Ikeda et al. | 380/270 |
| 2011/0153853 A1 | 6/2011 | London et al. | |
| 2011/0156879 A1* | 6/2011 | Matsushita et al. | 340/10.1 |
| 2011/0238506 A1* | 9/2011 | Perkowski et al. | 705/14.73 |
| 2011/0312278 A1* | 12/2011 | Matsushita et al. | 455/66.1 |
| 2012/0133484 A1* | 5/2012 | Griffin | 340/5.54 |

FOREIGN PATENT DOCUMENTS

| | | |
|---|---|---|
| JP | 2009-031859 | 2/2009 |
| JP | 2009-032130 | 2/2009 |
| JP | 2009-049679 | 3/2009 |
| JP | 2009-516288 | 4/2009 |
| JP | 2010-522370 | 7/2010 |
| JP | 2010-252059 | 11/2010 |
| WO | 2007057812 | 5/2007 |
| WO | 2009017110 | 7/2008 |
| WO | 2008115012 | 9/2008 |

OTHER PUBLICATIONS

"Virtual Machine Monitors: Current Technology and Future Trends", dated May 2005, pp. 1-10, IEEE Computer Society.

Combined Search and Examination Report Under Sections 17 and 18(3), for Application No. GB1209077.5, dated Sep. 14, 2012, pp. 1-5.

DE Office Action dated Dec. 19, 2012, Application No. DE102012210887, pp. 1-9.

Information Materials for IDS on DE office action, dated Dec. 19, 2012, pp. 1-4.

International Search Report, dated Jul. 14, 2008, for International Application Serial No. PCT/KR2008/001567, pp. 1-2.

* cited by examiner

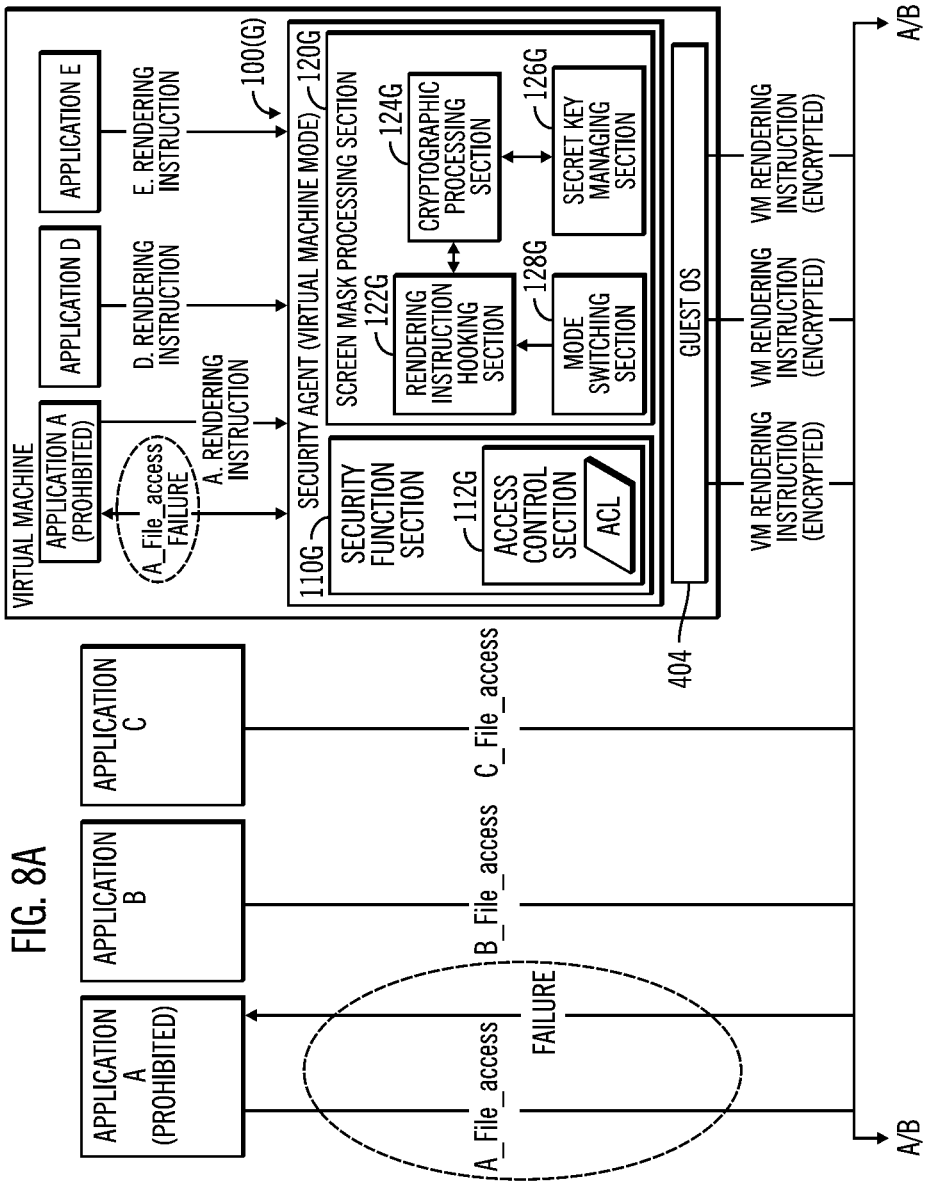

SECURELY MANAGING THE EXECUTION OF SCREEN RENDERING INSTRUCTIONS IN A HOST OPERATING SYSTEM AND VIRTUAL MACHINE

CROSS-REFERENCE TO RELATED FOREIGN APPLICATION

This application is a non-provisional application that claims priority benefits under Title 35, United States Code, Section 119(a)-(d) from Japanese Patent Application entitled "METHOD FOR CONSTRUCTING SAFELY MANAGED VIRTUAL MACHINE EXECUTION ENVIRONMENT, PROGRAM AND COMPUTER APPARATUS" by Aratsu TAKU, Masami TADA, and Sanehiro FURUICHI, having Japanese Patent Application Serial No. 2011-143993, filed on Jun. 29, 2011, which Japanese Patent Application is incorporated herein by reference in its entirety.

BACKGROUND OF THE INVENTION

1. Field of the Invention

The present invention relates to a computer readable storage medium, computer apparatus, and method for securely managing the execution of screen rendering instructions in a host operating system and virtual machine to improve the state of security of a virtualized environment.

2. Description of the Related Art

Recently, the use of a virtualized environment on a personal computer (PC) has become more common. Virtualization applications are provided for PCs and operating systems (OSs) with a virtualized environment installed. It is expected that opportunities for end users to use a virtualized environment on a PC will increase expand in the future. Here, the outline of virtualization in a PC will be given below.

FIG. 10 shows a PC 200 (real machine) in which a host based virtualized environment is constructed. The PC 200 (real machine) is provided with hardware 202 and a host OS 204 installed on the hardware 202, and various applications are installed on the host OS 204. A virtual machine 400 can be referred to as one application operating on the host OS 204. The virtual machine 400 is provided with a common platform 401 and a virtual hardware area 402. The virtual hardware area 402 is a functional part which emulates hardware (such as a CPU, a hard disk, BIOS, NIC, a keyboard and a mouse) of the real machine, and a user can install an OS (guest OS 404) different from the host OS 204 onto the virtual hardware area 402.

FIG. 11 shows a state in which a window screen 2000 of the virtual machine 400 is displayed on an upper layer of a host OS screen 1000 of the real machine 200. An OS screen of the guest OS 404 installed on the virtual machine 400 is displayed on the window screen 2000 of the virtual machine 400. The user can use two different OS environments at the same time, switching the two OS screens displayed on one display.

One purpose of a virtual machine is to allow an application which operates with only on an old-version OS to operate on the latest host OS. For example, when the host OS 204 of the real machine does not support the operation of applications D and E, the user can use the applications D and E by installing them on the guest OS 404 (old-version OS) of the virtual machine 400. In response to an instruction issued from the application D or E, the guest OS 404 attempts to control the virtual hardware area 402 as real hardware. The virtual machine 400 interprets a hardware control instruction issued from the guest OS 404 into a format which the real machine is compatible with and communicates it to the host OS 204.

As a result, it becomes possible for the applications D and E which are not compatible with the host OS 204 on the real machine to control the hardware 202 of the real machine. Undoubtedly, the technique of virtualization in a PC improves convenience for users as described above. On the other hand, however, the virtualization technique causes complications for administrators for the following reasons.

A lot of companies require PCs used by employees to have a security application resident thereon in order to make the employees observe a security policy. With regard to this point, Japanese Patent Laid-Open No. 2007-287078 (JP2007-287078A), also published as U.S. Pat. No. 7,624,427, discloses a program which judges the need for personal information management for data outputted from an application in real time, and, on the basis of a result of the judgment, continues, discontinues or modifies processing by the application. Such a security application controls file access and network access by an application operating on an OS in accordance with a security policy. However, when the security application is applied to a virtualized environment, a problem described below with respect to FIG. 12, occurs.

FIG. 12 shows a state in which a security agent 500, which is a conventional-type security application, has been introduced into the host OS of a real machine provided with a virtual machine environment. The security agent 500 is configured such that it includes an access control section 502 monitoring accesses related to a predetermined process or object on the basis of a security policy, a log monitoring section 504 recording a monitoring log, and the like. The access control section 502 is a function part which controls file access and network access by an application on the basis of an access control list defined in accordance with the security policy. If it is defined in the security policy that the use of "Application A" is prohibited, an API hooking means provided for the access control section 502 hooks file access or the like from "Application A" operating on the host OS 204 and returns an error thereto.

On the other hand, if the use of the virtual machine 400 is permitted by the security policy, the access control list of the access control section 502 is defined so that file access and the like from the virtual machine 400 is permitted. Here, a problem occurs when "Application A" is installed on the guest OS 404 of the virtual machine 400. In this case, file access from "Application A", which originally should be prohibited, goes through the access control section 502. This happens because the access control section 502 cannot distinguish between file access from "Application A" operating on the guest OS 404 and file access from "Application D" or "Application E", and, by recognizing both of them as file accesses from the virtual machine 400 (as one of applications operating on the host OS 404), permits the access on the basis of the access control list.

Of course, this problem is solved once by installing the same security agent 500 installed on the host OS 204, onto the guest OS 404 also. Unfortunately, the problem is not so simple. Because, even if an administrator compulsorily installs the security agent 500 on the guest OS 404 side, a user can easily uninstall it under his own authority, and the administrator who does not have authority on a virtual machine environment cannot know the fact that the security agent 500 has been uninstalled from the virtual machine. Therefore, in the present situation, all that the administrator can do is to request the user to introduce the security agent, leaving what to do to the user's conscience. That is, in the present situation, a virtual machine environment is a black box which an administrator cannot control, which increases security risks.

SUMMARY

Provided are a computer readable storage medium, computer apparatus, and method for securely managing the execution of screen rendering instructions in a host operating system and virtual machine. A first rendering instruction hooking section is set to a first mode to hook a screen rendering instruction issued by a virtual machine application in a virtual machine. A second rendering instruction hooking section is set to a second mode, after the setting of the first rendering instruction hooking section to the first mode, to hook instructions issued by the virtual machine application. The hooked screen rendering instruction issued by the virtual machine application are encrypted in response to the setting of the first mode, wherein outputting the encrypted screen rendering instructions to the display device results in illegible output. The hooked screen rendering instruction issued by the virtual machine application are encrypted in response to the setting of the second mode. The encrypted hooked screen rendering instructions encrypted in the second mode is issued to a host operating system to decrypt.

BRIEF DESCRIPTION OF THE DRAWINGS

FIGS. 8a and 8b are a diagram showing a state in which the security agent of the present embodiment is installed on both of the host OS and a guest OS.

DETAILED DESCRIPTION

Figure 1:
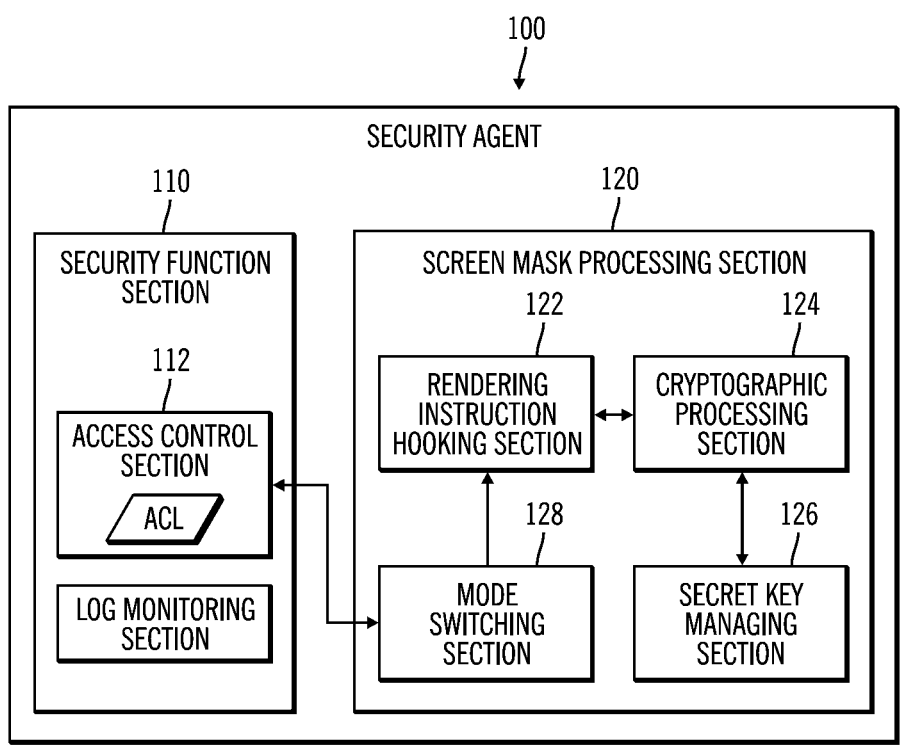
FIG. 1 is a functional block diagram of a security agent in accordance with described embodiments.

Described embodiments provide a method for constructing a safely managed virtual machine execution environment and a program used in the virtual machine execution environment.

In described embodiments, a means for selectively masking a window screen of a virtual machine and a security function are integrated onto a host operating system of a user terminal. Under the authority of an administrator, a program in which a security function that the administrator wants to be introduced into the virtual machine and means for releasing the mask are provided to a user.

Described embodiments provide a computer-executable program causing a computer to realize: access control means for controlling access by an application; rendering instruction hooking means for hooking a screen rendering instruction, the rendering instruction hooking means having a first mode for selectively hooking a screen rendering instruction issued by a virtual machine application and a second mode for hooking a screen rendering instruction issued by an application; cryptographic processing means for executing cryptographic processing of the screen rendering instruction which has been hooked, by a common key cryptographic system; and mode switching means for switching the operation mode of the rendering instruction hooking means.

The mode switching means may include means for judging which of a host OS and a guest OS an OS installed with the program is, and set the rendering instruction hooking means to the first mode at the time of a real machine mode in which the OS is the host OS, and to the second mode at the time of a virtual machine mode in which the OS is the guest OS. It is also possible to make a configuration causing the computer to realize secret key managing means for managing a secret key used for the cryptographic processing.

In the described embodiments, the secret key managing means can include: key generating means for generating a random key as the secret key; and key transmitting/receiving means for executing transmission/reception of the random key to/from another process, and can be configured to transmit the random key to the other process at the time of the real machine mode, and receive the random key from the other process at the time of the virtual machine mode. Furthermore, the key transmitting/receiving means can be configured to execute transmission/reception of the random key via a named pipe or a shared folder mechanism.

Furthermore, described embodiments provide a method for promoting construction of a safely managed virtual machine execution environment for a user terminal, the method comprising the steps of: installing a first security application on a host OS of the user terminal under administrator authority; and providing a second security application for a user of the user terminal, wherein the first security application is a computer-executable program causing a computer to realize: access control means for controlling access by an application; first rendering instruction hooking means for selectively hooking a screen rendering instruction issued by a virtual machine application; and cryptographic processing means for executing cryptographic processing of the screen rendering instruction which has been hooked by the first rendering instruction hooking means, by a common key cryptographic system; and the second security application is a computer-executable program causing a computer to realize: access control means for controlling access by an application; second rendering instruction hooking means for hooking a screen rendering instruction issued by an application; and cryptographic processing means for executing cryptographic processing of the screen rendering instruction which has been hooked by the second rendering instruction hooking means, by a common key cryptographic system.

Furthermore, according to the described embodiments, a computer apparatus is provided with a virtualized environment in which a virtual machine is constructed on a host OS, with a first security agent being resident on the host OS and a second security agent being resident on a guest OS of the virtual machine, wherein the first security agent comprises: an access control section for controlling access by an application on the host OS; a first rendering instruction hooking section for selectively hooking a screen rendering instruction issued by the virtual machine; and a cryptographic processing section for executing cryptographic processing of the screen rendering instruction which has been hooked by the first rendering instruction hooking section, by a common key cryptographic system; and the second security agent comprises: an access control section for controlling access by an application on the guest OS; a second rendering instruction hooking section for hooking a screen rendering instruction issued by an application on the guest OS; and a cryptographic processing section for executing cryptographic processing of the screen rendering instruction which has been hooked by the second rendering instruction hooking section, by a common key cryptographic system.

The described embodiments provide for constructing a safely managed virtual machine execution environment and a program used therefor.

The present invention will be described below with embodiments shown in drawings. The present invention, however, is not limited to the embodiments shown in the drawings. In each of figures referred to below, a common component is given the same reference numeral, and description thereof will be omitted as appropriate.

According to a method of the described embodiments, it is possible to construct a safely managed virtual machine execution environment. The described embodiments provide a security application applied to a host based virtualized environment. The security application of the described embodiments may comprise a program product installed on both of a host OS of a user terminal and a guest OS of a virtual machine. The program product refers to a recording medium in which a program is recorded and a form of being provided through a network. The program product according to the described embodiments realizes function means described below on a personal computer by being installed on the computer.

FIG. 1 shows a functional block diagram of a security agent 100 which is an embodiment of the security application. The security agent 100 is configured to include a security function section 110 and a screen mask processing section 120. The security function section 110 is configured to include at least an access control section 112. The access control section 112 is a functional part which executes mandatory access control for file access and network access by an application operating on an OS, and judges whether or not to permit access from an application in accordance with a security policy defined by an administrator. Specifically, the content of control is determined on the basis of an access control list (ACL) in which the security policy is set. In addition to the access control section 112, a necessary functional part, such as a log monitoring section, may be appropriately added to the security function section 110.

The screen mask processing section 120 is configured to include a rendering instruction hooking section 122, a cryptographic processing section 124, a secret key managing section 126 and a mode switching section 128. The rendering instruction hooking section 122 comprises an API hooking means for hooking a screen rendering instruction issued to a GDI (Graphical Device Interface) from an application operating on an OS and may have three operation modes. The three modes are: a first mode for selectively hooking only a screen rendering instruction issued by a virtual machine application; a second mode for hooking a screen rendering instruction issued by an application operating on an OS (including programs attached to the OS); and a third mode in which a screen rendering instruction is not hooked.

The cryptographic processing section 124 is a function part which performs cryptographic processing (encryption/decryption) of a screen rendering instruction hooked by the rendering instruction hooking section 122 by a common key cryptography system. In described embodiments, suitable method known in the art, such as block cipher and stream cipher utilizing EXCLUSIVE-OR operation for each bit, can be used as the common key cryptography system.

The secret key managing section 126 is a function part which manages a secret key to be the base of key data used in the EXCLUSIVE-OR operation for each bit (hereinafter simply referred to as XOR operation) executed by the cryptographic processing section 124. When block cipher is adopted, the cryptographic processing section 124 generates an extended key on the basis of the secret key read from the secret key managing section 126 and executes an XOR operation using the extended key. When stream cipher is adopted, the cryptographic processing section 124 generates a pseudo-random number sequence (key stream) with the secret key read from the secret key managing section 126 as an initial value, and executes XOR operation using the key stream.

In described embodiments, two security agents 100 installed on the host OS of a real machine and the guest OS of a virtual machine manage the same secret key (that is, a common key). The identity of the secret keys between both security agents is to set the same secret key for all the program products when they are manufactured. In this case, the secret key is kept in the secret key managing section 126 as a fixed value. In addition, the present invention can adopt a second method in which each of an administrator and a user sets a secret key at the time of installing an application, and a third method in which one security agent 100 automatically generates a secret key and notifies the other security agent 100 of the secret key.

The security agent 100 preferably has three operation modes. A first mode is "Real Machine Mode" for causing the security agent 100 to operate on the host OS of a real machine, and a second mode is "Virtual Machine Mode" for causing the security agent 100 to operate on the guest OS of a virtual machine. A third mode is "Setup Mode" for installing the security agent 100 on the guest OS of the virtual machine. The mode switching section 128 is a function part which works the rendering instruction hooking section 122 and the access control section 112 to realize these three operation modes, and it switches among the operation modes in response to an instruction from the outside or automatically. Next, a method for using the security agent 100 to provide a safely managed virtual machine execution environment is described.

After installing the security agent 100 onto a user's PC, an administrator provides a security agent 100 similar to the security agent 100 for the user and instructs the user to install it onto a virtual machine. In such case, the user may believe they do not need to obey the administrator's instruction if they know that the administrator cannot confirm whether the security agent 100 is actually installed on the virtual machine or not. The described embodiments provide a situation in which the user cannot but obey the administrator's instruction, as described in the sequence of steps below, with reference to FIG. 1.

(Step 1)

First, the administrator installs the security agent 100 onto the host OS of the user's PC. An operation mode and a secret key are set for the security agent 100. In further embodiments, these items are automatically set.

Figure 2A:
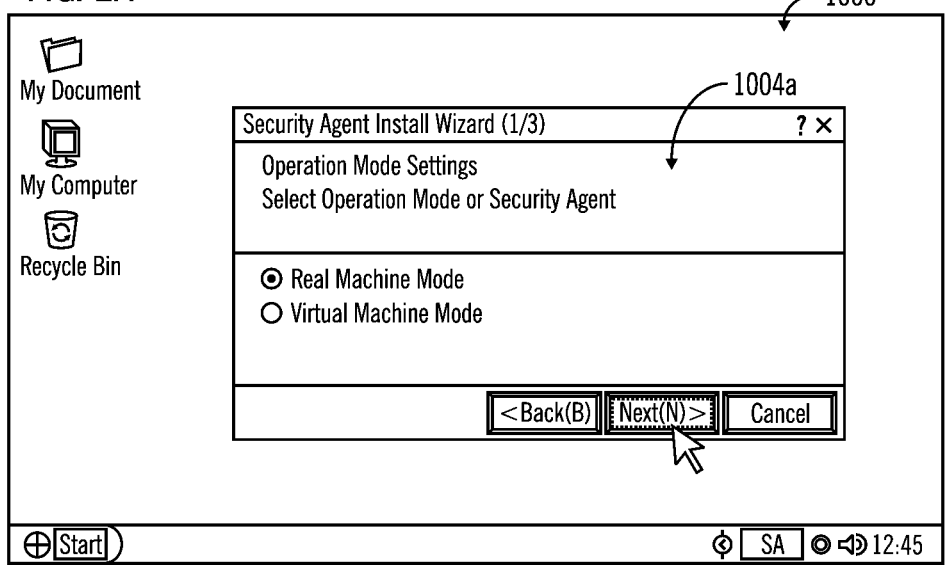
FIG. 2 is a diagram showing a host OS screen at the time of installing the security agent in accordance with described embodiments.

FIG. 2(a) shows a host OS screen 1000 at the time of performing installation work. An installation wizard 1004a is displayed on the host OS screen 1000. The administrator selects "Real Machine Mode" on an operation mode selection screen 1004a of the installation wizard shown in FIG. 2(a).

Figure 2B:
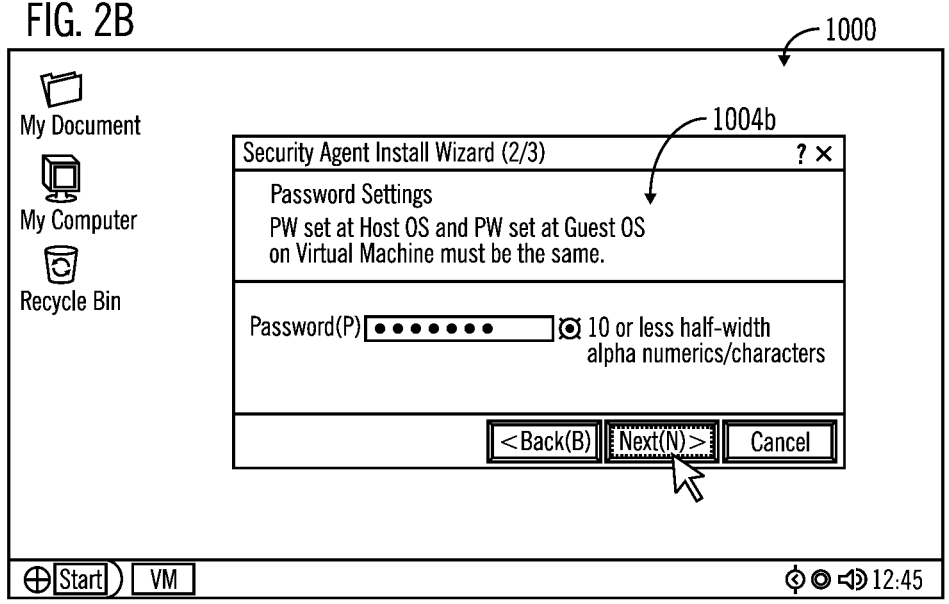

Then, the administrator inputs a password through a password setting screen 1004b of the installation wizard shown in FIG. 2(b). The selected "Real Machine Mode" is set for the mode switching section 128 of the security agent 100 installed on the host OS of the PC through the above procedure, and the inputted password is set for the secret key managing section 126 as a secret key. In the present embodiment, the security agent 100 is installed on the host OS under the authority of the administrator, and the user cannot uninstall it without permission and restricted in changing the setting content (the operation mode and the password). In the present embodiment, it is also possible to make a configuration in which the operation mode and the password are set from a dedicated dialog screen, instead of the installation wizard screen. The present invention is not limited to the specific configurations.

Figure 3:
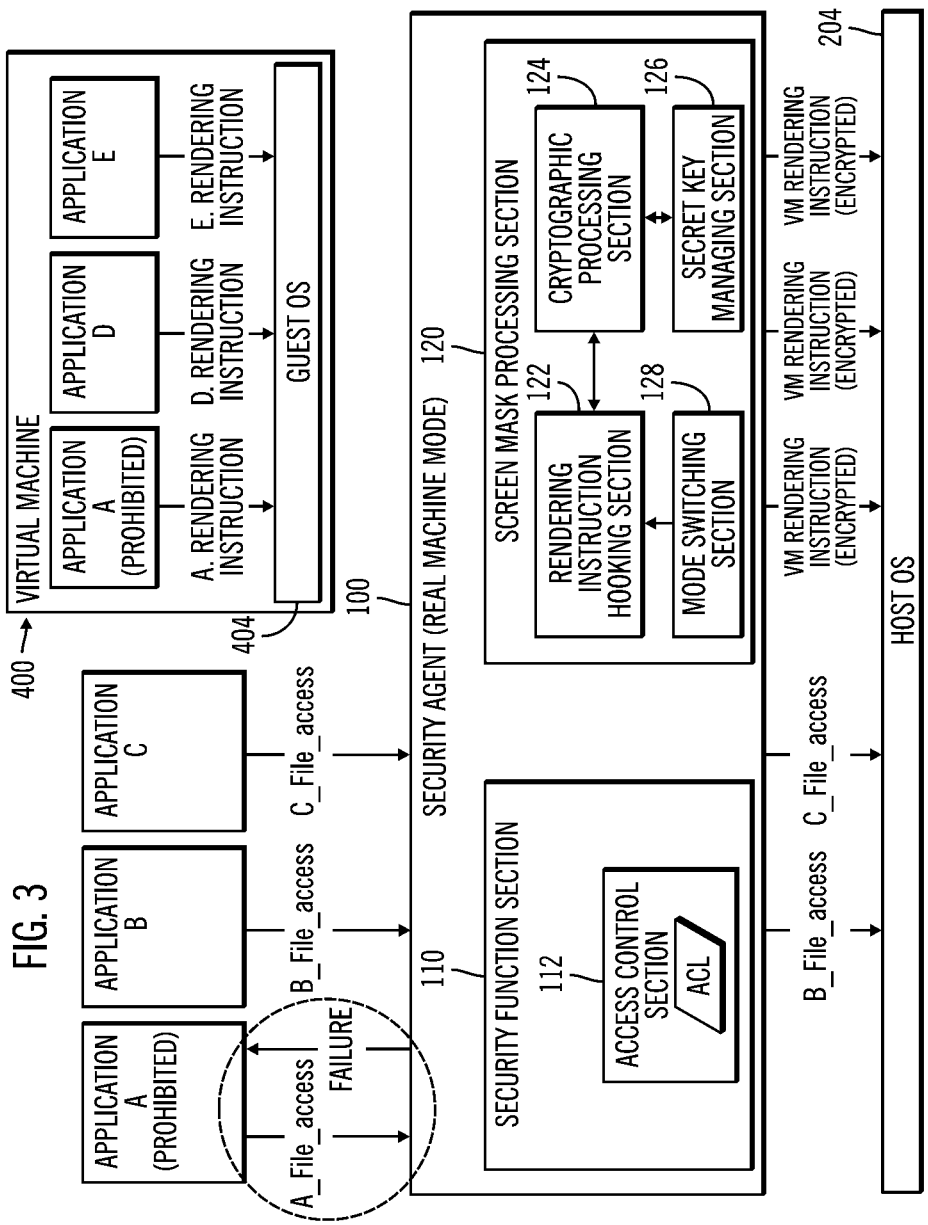
FIG. 3 is a diagram showing a state in which the security agent of the present embodiment is installed on a host OS of a PC in which a virtualized environment is constructed.

If the security agent 100 is installed only on the host OS of the PC, a virtualized environment is substantially disabled. This point will be described below on the basis of FIG. 3. FIG. 3 shows a state in which the security agent 100 is installed on the host OS 204 of the PC in which a virtualized environment is constructed. In the case of the example shown in FIG. 3, a virtual machine application 400 (hereinafter referred to as a virtual machine 400) is developed on the host OS 204 together with three applications "Application A", "Application B" and "Application C". In FIG. 3, the virtual hardware area and common platform of the virtual machine 400 are omitted (ditto with figures below). Furthermore, on the guest OS 404 of the virtual machine 400, three applications "Application A", "Application D" and "Application E" are developed. Here, "Application A" should be seen as an application the use of which is prohibited by a security policy.

As described, the mode switching section 128 of the security agent 100 on the host OS 204 is set to "Real Machine Mode". In this case, the mode switching section 128 sets the rendering instruction hooking section 122 to the first mode, that is, the mode for selectively hooking only a screen rendering instruction issued by the virtual machine 400. In one embodiment, within an area occupied by a window displaying the virtual machine 400, only the inside of the window, which is called a client area, is hooked, and a window frame and a title area, which are called non-client areas, are not hooked. As a result, screen rendering instructions issued from "Application A", "Application D" and "Application E" operating in the virtual machine 400, and screen rendering instructions issued from rendering applications (for rendering of a wallpaper or a desktop) attached to the guest OS 404 are hooked by the rendering instruction hooking section 122. In response to this, the cryptographic processing section 124 reads out the password (secret key) set for the secret key managing section 126, and executes encryption of the screen rendering instructions hooked by the rendering instruction hooking section 122 in a common key cryptographic system.

Figure 4:
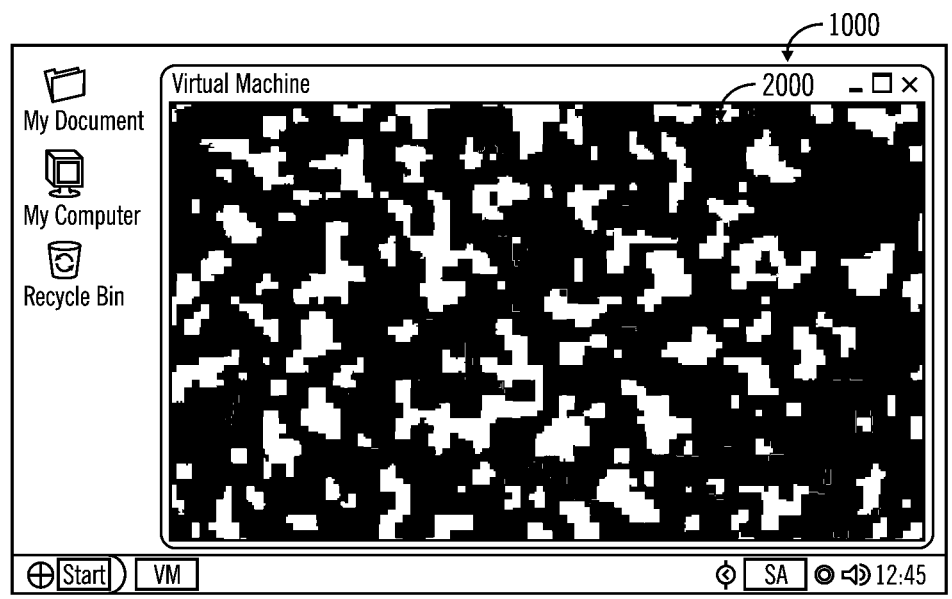
FIG. 4 is a diagram showing a window screen of a virtual machine in an illegible state.

When the encrypted screen rendering instructions are transferred from the screen mask processing section 120 to the host OS 204 and outputted to a display device after being processed by the GDI and a video driver not shown, a window screen 2000 of the virtual machine 400 comes into an illegible state as shown in FIG. 4, and the user cannot perform an operation on the screen. As a result, it is substantially impossible to use any of the applications operating in the virtualized environment (the prohibited "Application A", as well as "Application D" and "Application E").

(Step 2)

After the user completes installation of the security agent 100 onto the PC, the administrator announces to the user that the mask of the window screen is released as far as the security agent 100 is installed on the virtual machine 400. Then, the administrator provides a security agent 100 for the guest OS for the user together with password information (secret key) set for the security agent 100 of the host OS 204, and leaves what to do to the user's voluntariness. However, when such a situation is created by the administrator, the user who wants to use a virtualized environment cannot but accept to install the security agent 100, the installation of which is desired by the administrator, onto the virtual machine 400.

(Step 3)

Figure 5A:
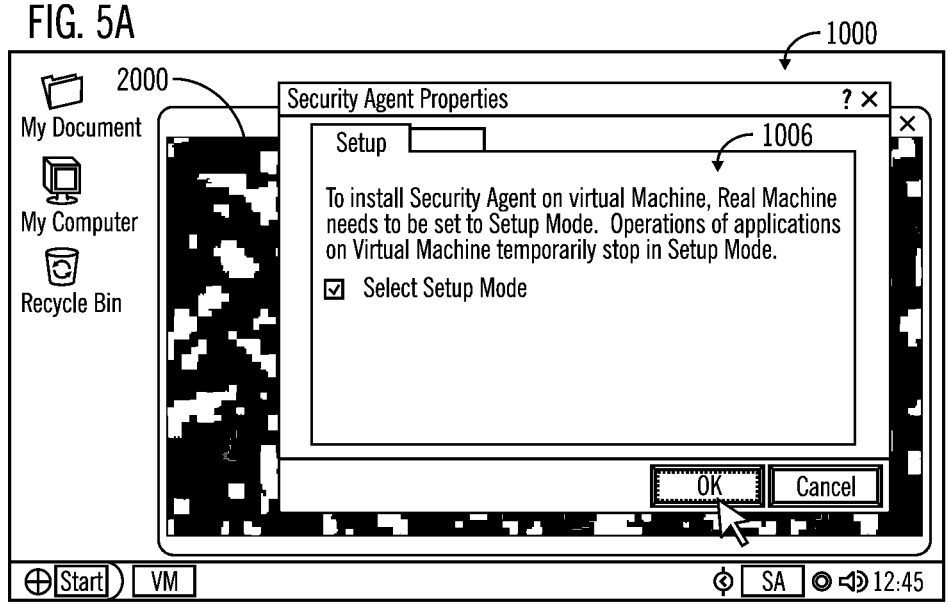
FIG. 5 is a diagram showing a property screen for setting "Setup Mode".

Receiving the announcement from the administrator, the user installs the security agent 100 onto the virtual machine 400. However, the installation operation cannot be performed in the state in which the window screen 2000 of the virtual machine 400 is masked. Therefore, the security agent 100 on the host OS 204 is set to "Setup Mode". The authority of the administrator is needed to change the setting content of the security agent 100 on the host OS 204. In the present embodiment, however, the user is permitted only to set "Setup Mode". In this case, the user can call a property screen 1006 as shown in FIG. 5(a) from the security agent 100 and set "Setup Mode".

Figure 5B:
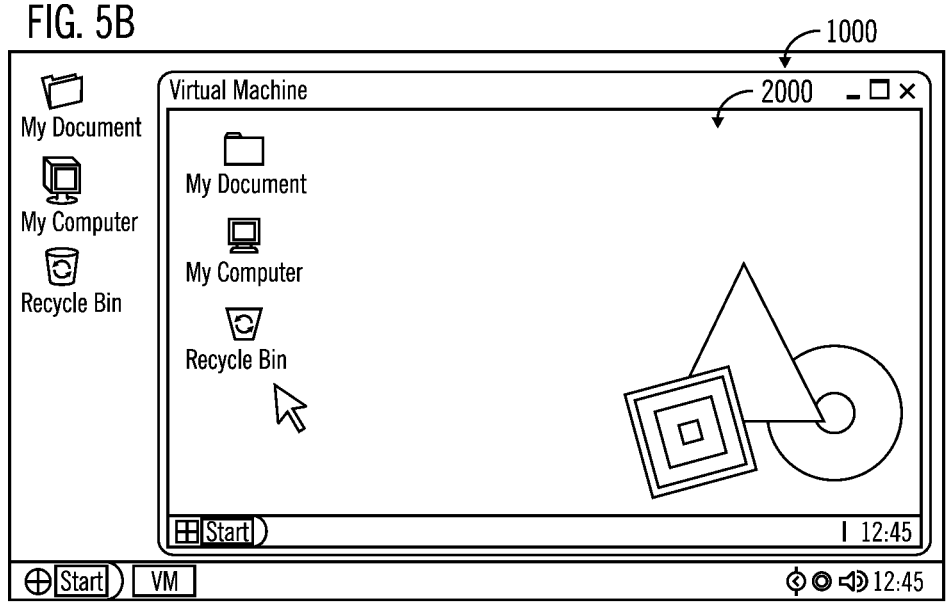
Figure 6:
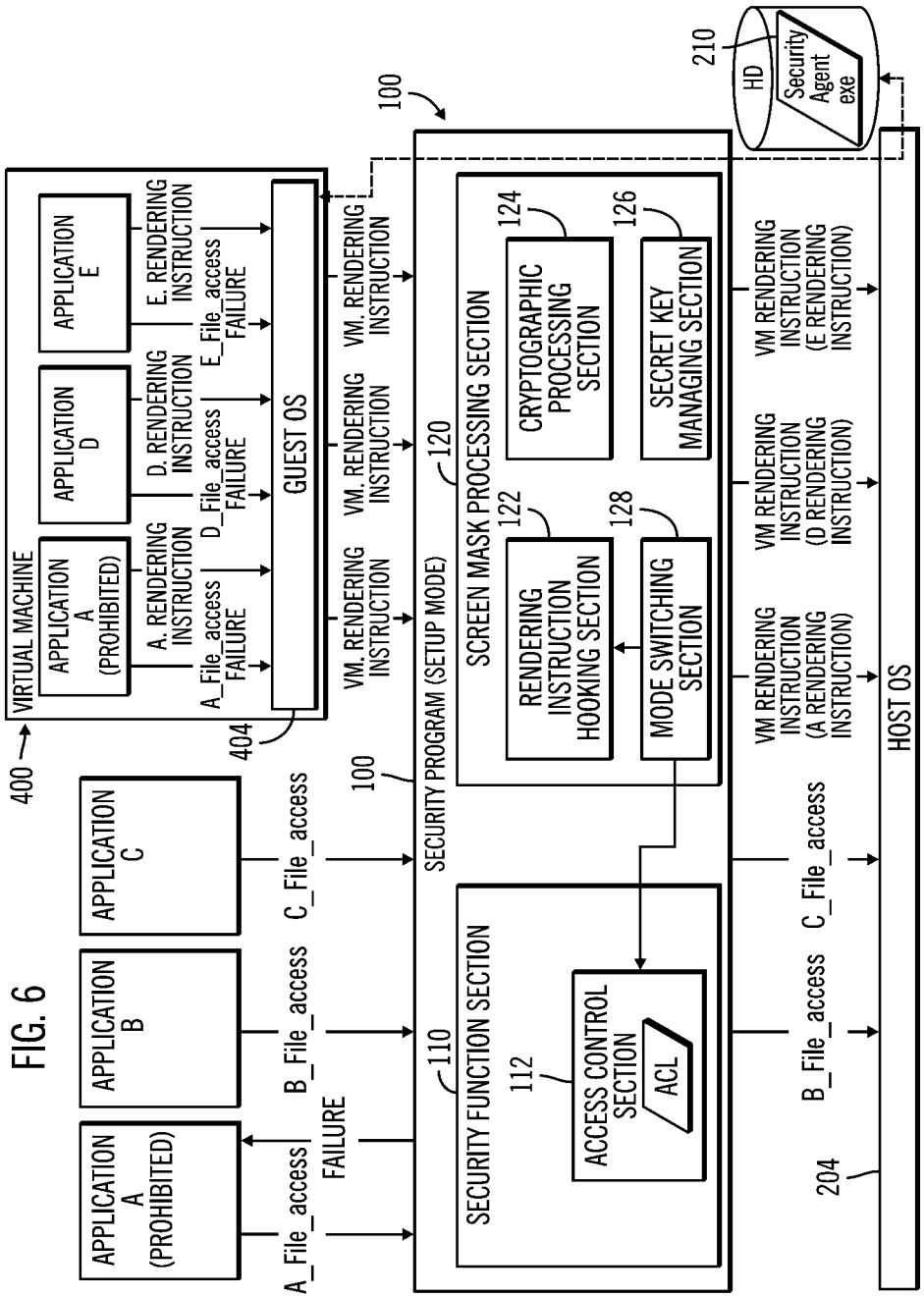
FIG. 6 is a diagram showing a state in which the security agent of the present embodiment is set to "Setup Mode".

FIG. 6 shows a state in which the security agent 100 on the host OS 204 is set to "Setup Mode". In "Setup Mode", the mode switching section 128 sets the rendering instruction hooking section 122 to the third mode, that is, the mode in which screen rendering instructions are not hooked. As a result, screen rendering instructions issued from the virtual machine 400 go through the security agent 100 and are immediately transferred to the host OS 204. Therefore, the window screen 2000 of the virtual machine 400 returns to a normal state as shown in FIG. 5(b).

At the same time, the mode switching section 128 requests the access control section 112 to change the content of access restriction for the virtual machine 400 in "Setup Mode". Specifically, the mode switching section 128 requests the access control section 112 to prohibit all file accesses and network accesses except file accesses to an EXE file 210 containing the program of the security agent 100 among file accesses issued from the virtual machine 400. In response to this, the access control section 112 modifies an ACL as requested. Under the setting condition described above, the user is permitted to access the EXE file 210 by operating the window screen 2000, it becomes possible for the user to execute the work of installing the security agent 100.

In "Setup Mode", since screen rendering instructions issued from the virtual machine 400 are transferred without being hooked, all screens including screens of the prohibited "Application A" are displayed. However, by the access control section 112 changing the content of control, all file accesses (except the EXE file 210) and network accesses from the virtual machine 400 are disabled, and, meanwhile, "Application A" freezes and cannot be used. That is, in "Setup Mode", the security state of the PC is appropriately maintained. However, it should be noted that, in this state, "Application D" and "Application E", which originally should be permitted to be used, also cannot be used similarly.

Figure 7A:
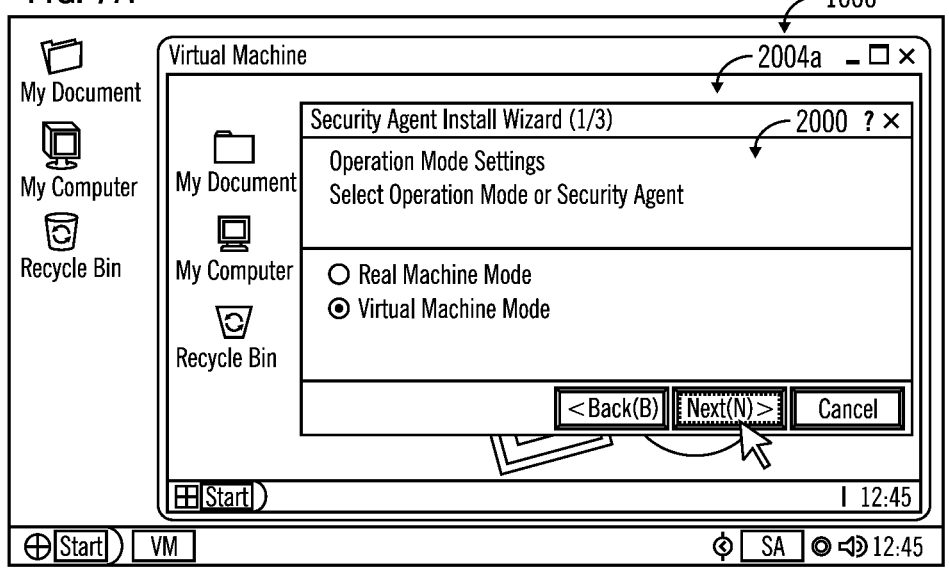
FIG. 7 is a diagram showing a window screen of the virtual machine at the time of installing the security agent in accordance with described embodiments.
Figure 7B:
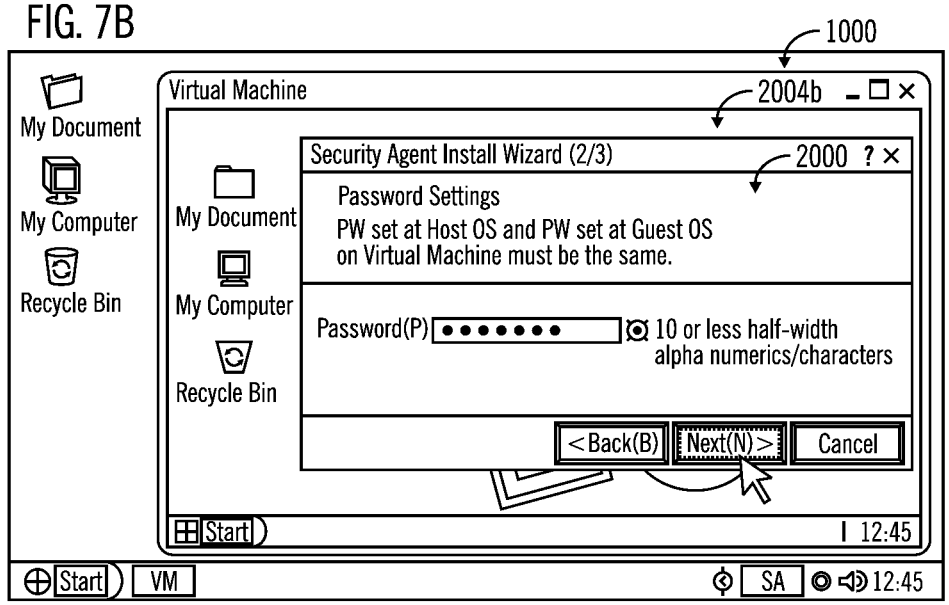

FIG. 7 shows the window screen 2000 of the virtual machine 400 at the time of performing the installation work. An installation wizard 2004 is displayed on the window screen 2000. The user selects "Virtual Machine Mode" on an operation mode selection screen 2004a of the installation wizard shown in FIG. 7(a). Then, the user inputs a password provided by the administrator via a password setting screen 2004b of the installation wizard shown in FIG. 7(b). When having completed the installation work in accordance with the installation wizard, the user calls the property screen 1006 of the security agent 100 on the host OS 204 again and releases "Setup Mode". In response to this, the security agent 100 on the host OS 204 returns to "Real Machine Mode". Alternatively, it is also possible to make a configuration such that the host OS 204 side automatically detects completion of installation and, in response to this, the security agent 100 on the host OS 204 returns to "Real Machine Mode".

Figure 8B:
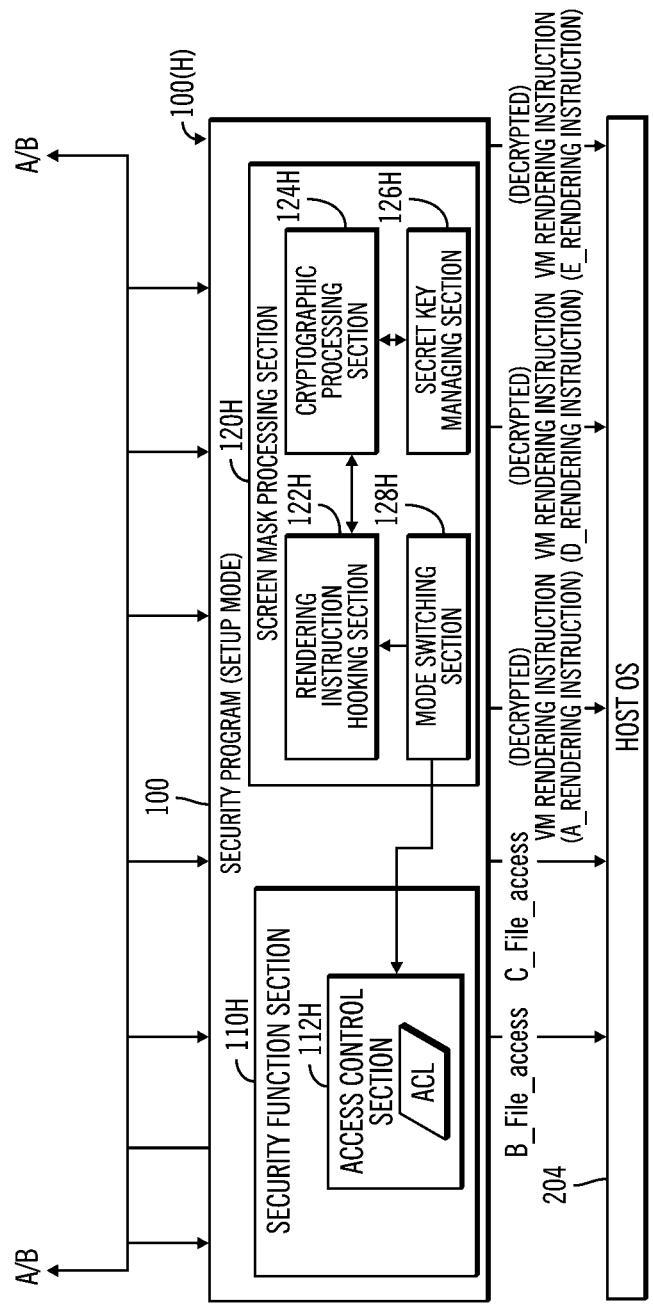

FIGS. 8a and 8b show a state in which the security agent 100 is installed on both of the host OS 204 and the guest OS 404. In FIGS. 8a and 8b, in order to distinguish between the two agents, the security agent 100 on the host OS 204 side is shown as a security agent 100(H), and the security agent 100 on the guest OS 404 side is shown as a security agent 100(G).

By the setting of an operation mode by the user shown in FIG. 7(a), "Virtual Machine Mode" is set for the security agent 100(G). In this case, the mode switching section 128G sets the rendering instruction hooking section 122G to the second mode, that is, the mode for hooking screen rendering instructions issued by applications on an OS. As a result, screen rendering instructions issued from "Application A", "Application D" and "Application E" operating in the virtual machine 400, and screen rendering instructions issued from rendering applications attached to the guest OS 404 are hooked by the rendering instruction hooking section 122G. In response to this, the cryptographic processing section 124G reads out a password (secret key) set for the secret key managing section 126G, and executes cryptographic processing (encryption) of the screen rendering instructions hooked by the rendering instruction hooking section 122G in the common key cryptographic system. It should be noted that, by the setting of a password by the user shown in FIG. 7(b), the same secret key set for the secret key managing section 126H of the security agent 100(H) is set for the secret key managing section 126G.

Screen rendering instructions encrypted by XOR operation by the screen mask processing section 120G are issued from the virtual machine 400 to the host OS 204. At this time, the rendering instruction hooking section 122H of the security agent 100(H) operating in "Real Machine Mode" selectively hooks the screen rendering instructions (encrypted screen rendering instructions) issued from the virtual machine 400. In response to this, the cryptographic processing section 124H reads out the password (secret key) set for the secret key managing section 126H, and executes cryptographic processing (decryption) of the screen rendering instructions (encrypted screen rendering instructions) hooked by the rendering instruction hooking section 122H in the common key cryptographic system. That is, since XOR operation using the same key data is performed twice when the security agent 100 is installed on both of the host OS 204 and the guest OS 404, all screen rendering instructions issued in the virtual machine 400 are transferred to the host OS 204 in a state of being returned to plaintext, and, as a result, all the screens including the screens of the prohibited "Application A" are displayed.

On the other hand, the access control section 112G of the security agent 100(G) is operating with the same control content as the access control section 112H of the security agent 100(H), and, therefore, all file accesses and network accesses from "Application A" are prohibited while accesses from "Application D" and "Application E" are permitted. That is, by introducing the security agent 100(G) into the virtual machine 400, the virtual machine 400 is placed in the same security environment as the real machine.

As described above, the user is permitted to use the virtual machine environment in exchange for installing the security agent 100(G) onto the virtual machine 400 (that is, observing the security policy defined by the administrator). The configuration of the present invention does not compulsorily prevent the user from uninstalling the security agent 100(G) or installing a different virtual machine application without permission of the administrator. However, it can have a substantially equivalent effect on the user, and, as a result, a safely managed virtual machine execution environment is constructed.

In the embodiment described above, an aspect of switching the operation mode (Real Machine Mode/Virtual Machine Mode) of the security agent 100 by a user instruction has been shown. However, it is also possible to make a configuration such that the security agent 100 itself switches the operation mode autonomously. In this case, the mode switching section 128 is provided with means for judging which of the host OS and the guest OS the OS installed with the security agent 100 is, on the basis of hardware attributes or BIOS information read from the OS. If judging that the OS installed with the security agent 100 is the host OS, the mode switching section 128 sets the security agent 100 to "Real Machine Mode", and, if judging that the OS installed with the security agent 100 is the guest OS, sets the security agent 100 to "Virtual Machine Mode".

In the embodiment described above, a configuration has been described in which a secret key shared by two security agents 100 installed on the host OS of a real machine and the guest OS of a virtual machine is set as a fixed key. It is also possible to make a configuration such that the secret key is dynamically updated to prevent secret key information from being stolen and used by a malicious program. This point will be described below with reference to FIG. 9.

Figure 9:
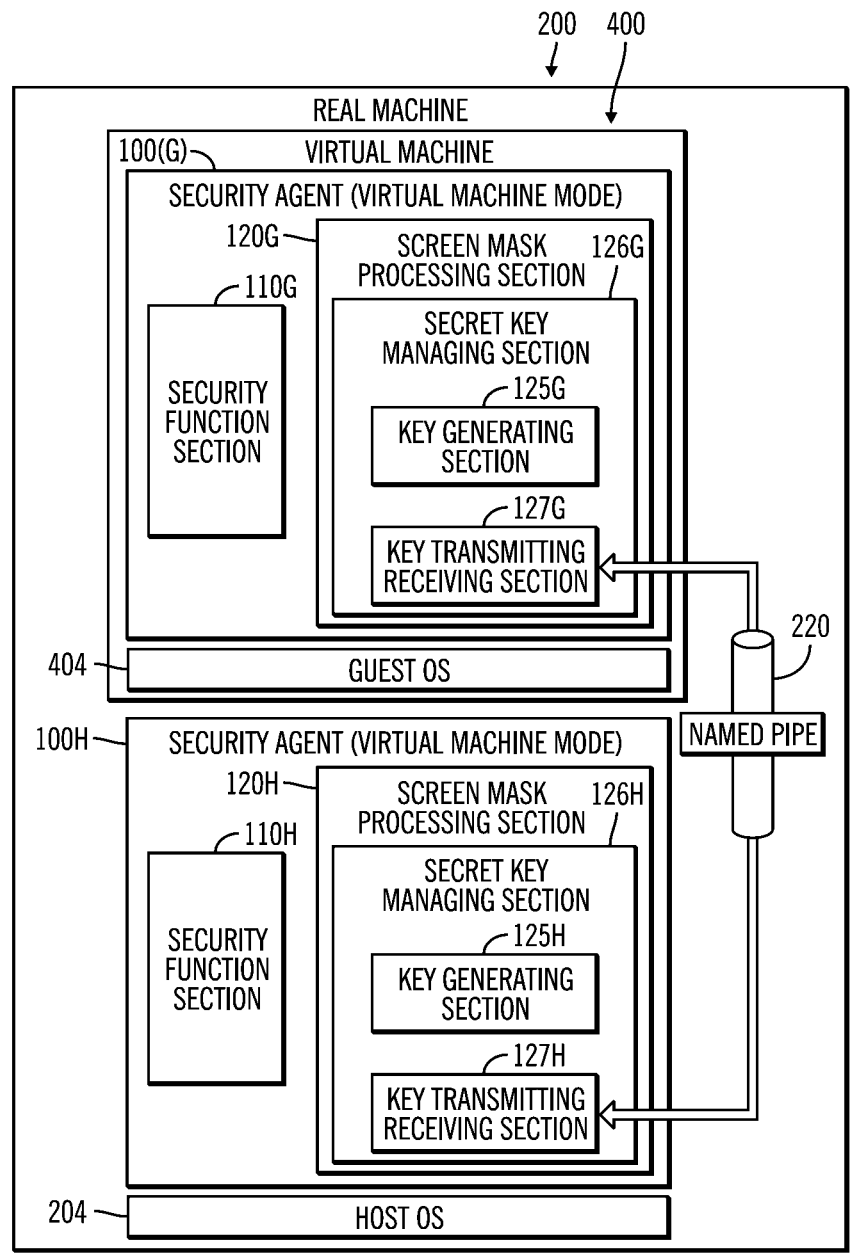
FIG. 9 is a diagram showing a PC installed with the security agent of the present embodiment adopting a configuration of dynamically updating a secret key.
Figure 10:
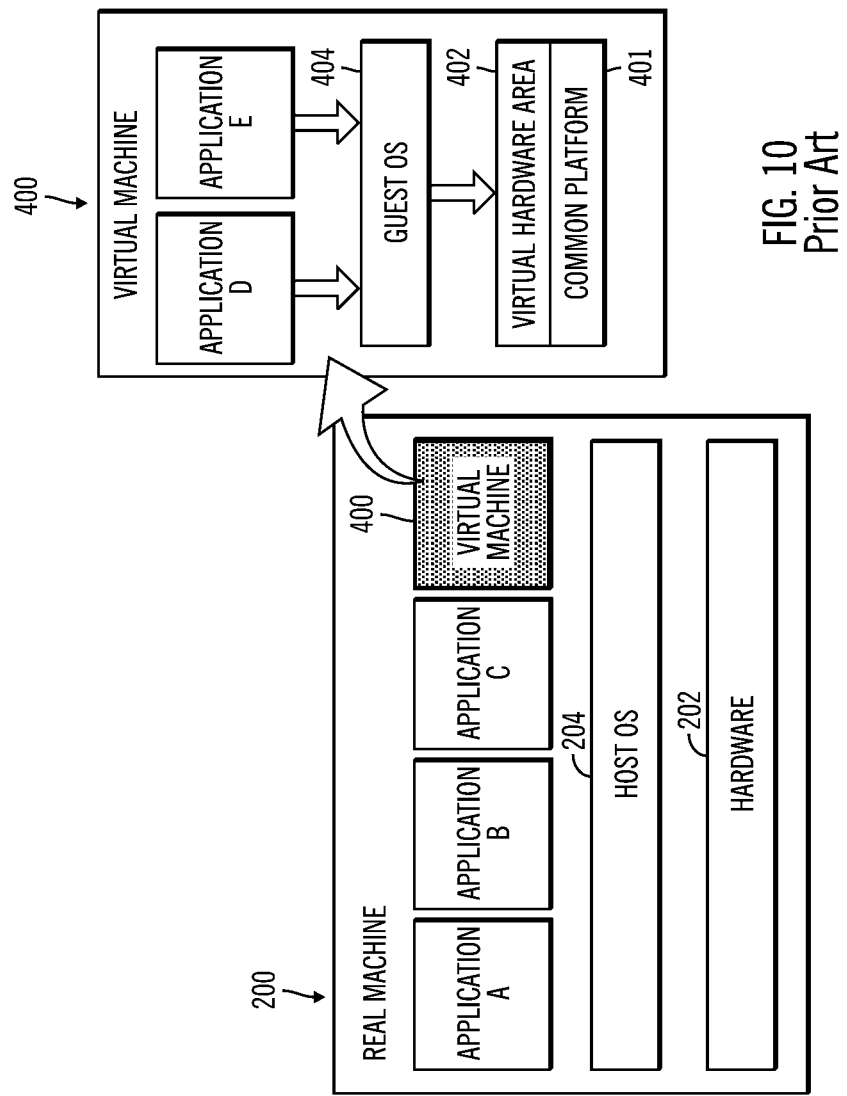
FIG. 10 is a diagram showing a PC in which a host based virtualized environment is constructed as known in the prior art.
Figure 11:
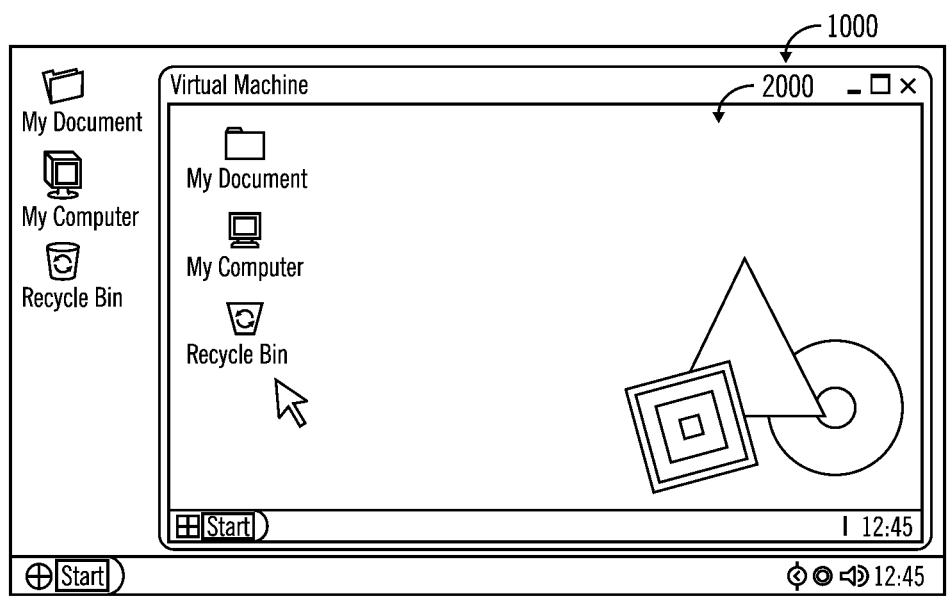
FIG. 11 is a diagram showing a state in which a window screen of the virtual machine is displayed on an upper layer of a host OS screen of a real machine as known in the prior art.
Figure 12:
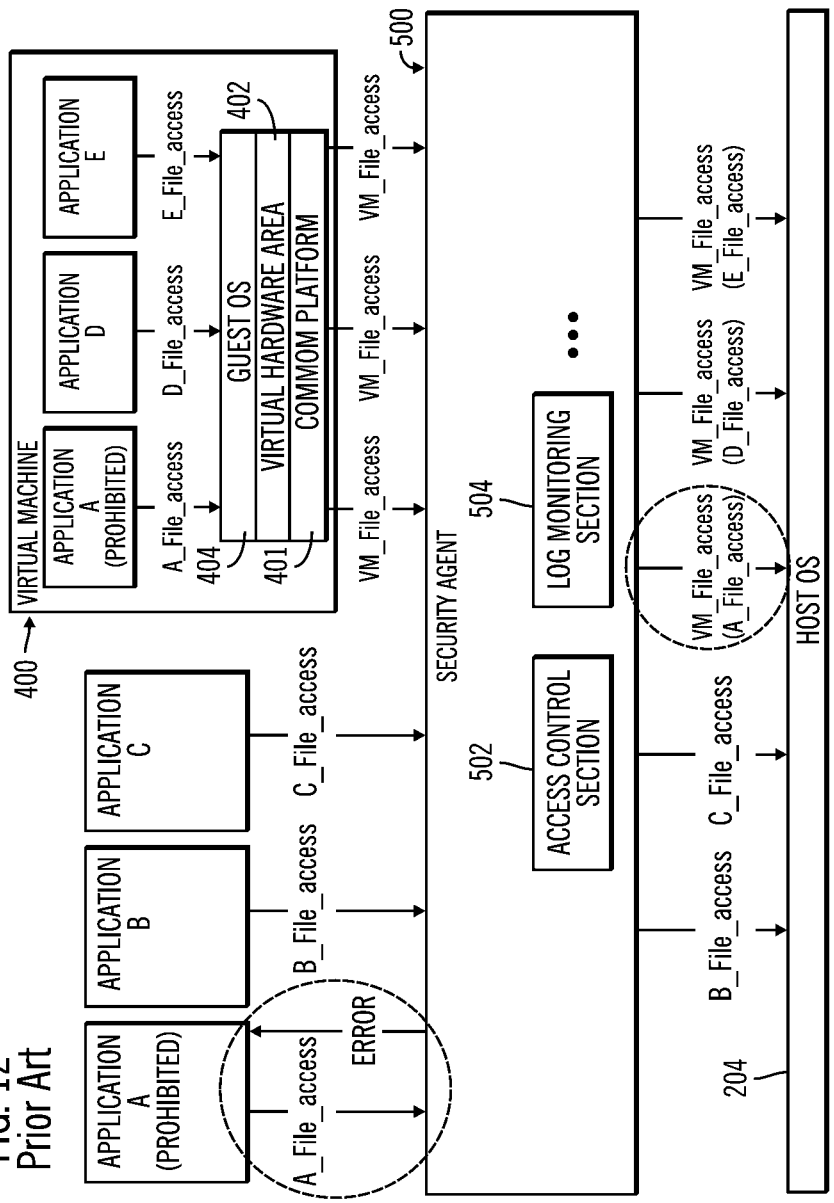
FIG. 12 is a diagram showing a state in which a conventional-type security agent has been introduced onto the host OS of a real machine provided with a virtual machine environment as known in the prior art.
Figure 13:
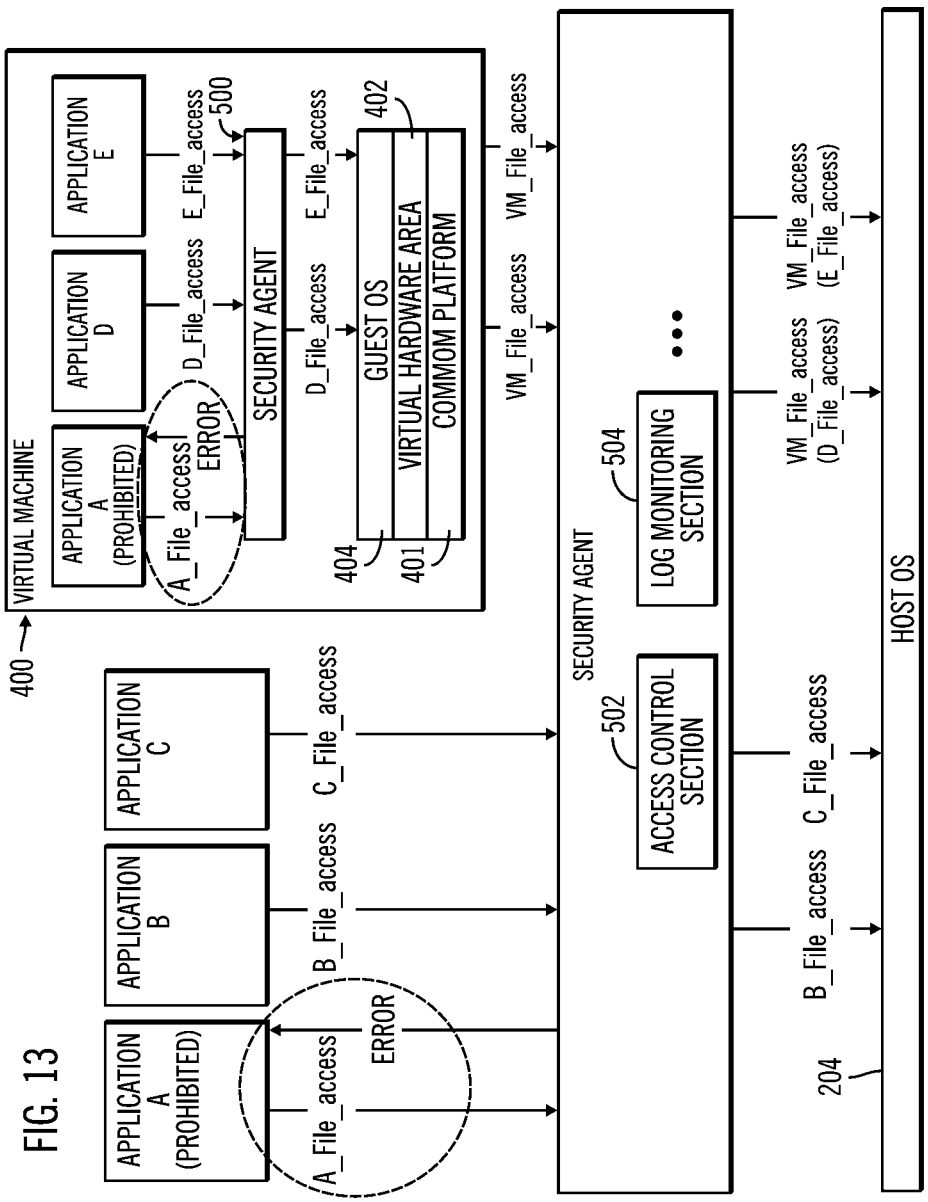
FIG. 13 is a diagram showing a state in which the conventional-type security agent is installed on both of the host OS and a guest OS.

FIG. 9 shows the PC 200 (real machine) installed with the security agent 100 adopting the configuration of dynamically updating the secret key. The secret key managing section 126 of the security agent 100 is provided with a key generating section 125 for dynamically generating a random key and a key transmitting/receiving section 127 for executing transmission/reception of the random key to/from another process. The secret key managing section 126 may have two operation modes. The two operation modes are: a first mode for dynamically generating a random key as a secret key and transmitting it to another process, and a second mode for receiving a random key from another process and setting it as a secret key (updating a secret key with the secret key). The mode switching section 128 not shown switches between the two operation modes of the secret key managing section 126. Specifically, when the security agent 100 is set to "Real Machine Mode", the mode switching section 128 sets its secret key managing section 126 to the first mode, and, when the security agent 100 is set to "Virtual Machine Mode", sets its secret key managing section 126 to the second mode.

In FIG. 9, the secret key managing section 126H of the security agent 100(H) on the host OS 204 operates in the first mode. As a result, the key generating section 125H dynamically generates a random key as a secret key, and the key transmitting/receiving section 127H transmits the generated random key to another process (that is, the secret key managing section 126G of the security agent 100(G)). On the other hand, the secret key managing section 126G of the security agent 100(G) on the guest OS 404 operates in the second mode. As a result, the key transmitting/receiving section 127G of the secret key managing section 126G receives the random key from another process (that is, the secret key managing section 126H of the security agent 100(H)), and sets it as a secret key (updates a secret key with the secret key). At this time, interprocess communication between the secret key managing section 126H and the secret key managing section 126G can be executed via a named pipe 220.

When a virtual machine application is equipped with a shared folder function which makes it possible to perform reading and writing of a particular file on the host OS 204 from the guest OS 404, it is also possible to provide a file for a secret key on a shared folder and share (transmit/receive) the secret file via the file. In order to prevent unauthorized access to secret key information, it is desirable to keep the named pipe and shared folder used for transmission/reception of a secret key in a secure state by providing appropriate access restrictions, encrypting communication data and files, and so on.

In certain embodiments, there are two switchable operation modes, "Real Machine Mode" and "Virtual Machine Mode". However, the embodiments are not limited to the embodiments described above. For example, the method of the present invention can be realized by preparing a first security application the operation of which is set to "Real Machine Mode" by default and a second security application the operation of which is set to "Virtual Machine Mode" by default separately so that an administrator provides the second security application for a user after installing the first security application onto the host OS of a user terminal under the authority of the administrator. Other embodiments may be included within the scope of the present invention as far as it gives the operation and advantages of the present invention within the range of aspects which one skilled in the art would think of.

The above functions of the present invention can be realized by an apparatus-executable program written in C, object-oriented programming languages such as C++, C# and Java (R), and the like. The program of the present embodiment can be distributed, being stored in an apparatus-readable recording medium such as a hard disk device, CD-ROM, MO, DVD, flexible disk, EEPROM and EPROM or can be transmitted via a network in a format readable to other apparatuses.

What is claimed is:

1. A computer readable storage device including a program executed to perform operations and interact with a display device to render screen rendering instructions, the operations comprising:
    setting a first rendering instruction hooking section to a first mode to hook a screen rendering instruction issued by a virtual machine application;
    setting a second rendering instruction hooking section to a second mode, after the setting of the first rendering instruction hooking section to the first mode, to hook instructions issued by the virtual machine application;
    encrypting the hooked screen rendering instruction issued by the virtual machine application in response to the setting of the first mode, wherein outputting the encrypted screen rendering instructions to the display device results in illegible output;
    encrypting the hooked screen rendering instruction issued by the virtual machine application in response to the setting of the second mode; and
    issuing the encrypted hooked screen rendering instruction encrypted in the second mode to a host operating system to decrypt.

2. The computer readable storage device of claim 1, wherein the operations further comprise:
    receiving in the host operating system the encrypted hooked screen rendering instruction encrypted in the second mode;
    decrypting the received encrypted hooked screen rendering instruction to produce a decrypted hooked screen rendering instruction from the virtual machine; and
    outputting the decrypted hooked screen to a display device to render in plaintext.

3. The computer readable storage device of claim 1, wherein the operations further comprise:
    determining whether the program is installed on the host operating system or a guest operating system on the virtual machine, wherein the first rendering instruction hooking section is set to the first mode in response to determining that the program is installed on the host operating system, wherein the second rendering instruction hooking section is set to the second mode in response to determining that the program is installed on the guest operating system.

4. The computer readable storage device of claim 1, wherein the operations further comprise:
    managing a secret key used for the encrypting of the hooked screen rendering instruction in the first mode and the second mode.

5. The computer readable storage device of claim 4, wherein managing the secret key comprises:
    generating a random key as the secret key;
    transmitting the generated secret key to another process to use for cryptographic processing; and
    receiving the generated secret key from another process to use for cryptographic processing.

6. The computer readable storage device of claim 5, wherein the secret key is transmitted when the first mode is set, and wherein the secret key is received when the second mode is set.

7. The computer readable storage device of claim 5, wherein the secret key is transmitted and received via a named pipe.

8. The computer readable storage device of claim 5, wherein the secret key is transmitted and received via a shared folder mechanism.

9. The computer readable storage device of claim 1, wherein a first instance of the program is installed on the host operating system, wherein the operations further comprise:
    installing a second instance of the program onto the virtual machine after installing the first instance of the program onto the host operating system.

10. The computer readable storage device of claim 9, wherein the operations further comprise:
    setting the first rendering instruction hooking section in the first instance of the program to a setup mode, wherein in the setup mode, screen rendering instructions are not hooked to enable the installing of the second instance of the program on the virtual machine.

11. A computer apparatus, comprising:
    hardware;
    a host operating system installed on the hardware;
    a virtualized environment in which a virtual machine is implemented in the host operating system;
    a first security agent implemented on the host operating system;
    a second security agent implemented on a guest operating system of the virtual machine;
    wherein the first security agent performs:
        setting a first rendering instruction hooking section to a first mode to hook a screen rendering instruction issued by a virtual machine application; and
        encrypting the hooked screen rendering instruction issued by the virtual machine application in response to the setting of the first mode, wherein outputting the encrypted screen rendering instructions to the display device results in illegible output;
    wherein the second security agent performs:

setting a second rendering instruction hooking section to a second mode, after the setting of the first rendering instruction hooking section to the first mode, to hook instructions issued by the virtual machine application;

encrypting the hooked screen rendering instruction issued by the virtual machine application in response to the setting of the second mode; and issuing the encrypted hooked screen rendering instruction encrypted in the second mode to host operating system to decrypt.

12. The computer apparatus of claim 11, wherein the first security agent further performs:

receiving in the host operating system the encrypted hooked screen rendering instruction;

decrypting the received encrypted hooked screen rendering instruction to produce a decrypted hooked screen rendering instruction from the virtual machine; and outputting the decrypted hooked screen to a display device to render in plaintext.

13. The computer apparatus of claim 11, wherein the first and second security agents further perform:

determining whether the program is installed on the host operating system or a guest operating system, wherein the first rendering instruction hooking section is set to the first mode in response to determining that the program is installed on the host operating system, wherein the second rendering instruction hooking section is set to the second mode in response to determining that the program is installed on the guest operating system.

14. The computer apparatus of claim 11, wherein the first and second security agents further perform:

managing a secret key used for the encrypting of the hooked screen rendering instruction in the first mode and the second mode.

15. The computer apparatus of claim 14, wherein managing the secret key comprises:

generating a random key as the secret key;

transmitting the generated secret key to another process to use for cryptographic processing; and receiving the generated secret key from another process to use for cryptographic processing.

16. The computer apparatus of claim 11, wherein the second security agent is installed on the virtual machine after installing the first security agent onto the host operating system.

17. The computer apparatus of claim 16, wherein the first security agent further performs:

setting the first rendering instruction hooking section to a setup mode, wherein in the setup mode, screen rendering instructions are not hooked to enable the installing of the second security agent.

18. A method, comprising:

setting, by hardware, a first rendering instruction hooking section to a first mode to hook a screen rendering instruction issued by a virtual machine application;

setting a second rendering instruction hooking section to a second mode, after the setting of the first rendering instruction hooking section to the first mode, to hook instructions issued by the virtual machine application;

encrypting the hooked screen rendering instruction issued by the virtual machine application in response to the setting of the first mode, wherein outputting the encrypted screen rendering instructions to the display device results in illegible output;

encrypting the hooked screen rendering instruction issued by the virtual machine application in response to the setting of the second mode; and issuing the encrypted hooked screen rendering instruction encrypted in the second mode to a host operating system to decrypt.

19. The method of claim 18, further comprising:

receiving in the host operating system the encrypted hooked screen rendering instruction encrypted in the second mode;

decrypting the received encrypted hooked screen rendering instruction to produce a decrypted hooked screen rendering instruction from the virtual machine; and outputting the decrypted hooked screen to a display device to render in plaintext.

20. The method of claim 18, further comprising:

determining whether the program is installed on the host operating system or a guest operating system on the virtual machine, wherein the first rendering instruction hooking section is set to the first mode in response to determining that the program is installed on the host operating system, wherein the second rendering instruction hooking section is set to the second mode in response to determining that the program is installed on the guest operating system.

21. The method of claim 18, further comprising:

managing a secret key used for the encrypting of the hooked screen rendering instruction in the first mode and the second mode.

22. The method of claim 21, wherein managing the secret key comprises:

generating a random key as the secret key;

transmitting the generated secret key to another process to use for cryptographic processing; and receiving the generated secret key from another process to use for cryptographic processing.

23. The method of claim 18, wherein a first instance of the program is installed on the host operating system, wherein the operations further comprise:

installing a second instance of the program onto the virtual machine after installing the first instance of the program onto the host operating system.

24. The method of claim 23, further comprising:

setting the first rendering instruction hooking section in the first instance of the program to a setup mode, wherein in the setup mode, screen rendering instructions are not hooked to enable the installing of the second instance of the program on the virtual machine.

* * * * *